US012365196B2

(12) United States Patent
Sharma et al.

(10) Patent No.: US 12,365,196 B2
(45) Date of Patent: Jul. 22, 2025

(54) PERSONALIZABLE SECURITY DOCUMENT AND METHOD OF MANUFACTURING THE SAME

(71) Applicant: HID Global CID SAS, Suresnes (FR)

(72) Inventors: Nipun Sharma, Colombes (FR); John Aldridge Keagy, Round Rock, TX (US)

(73) Assignee: HID Global CID SAS, Suresnes (FR)

( * ) Notice: Subject to any disclaimer, the term of this patent is extended or adjusted under 35 U.S.C. 154(b) by 0 days.

(21) Appl. No.: 18/563,795

(22) PCT Filed: May 18, 2022

(86) PCT No.: PCT/EP2022/063452
§ 371 (c)(1),
(2) Date: Nov. 22, 2023

(87) PCT Pub. No.: WO2022/248309
PCT Pub. Date: Dec. 1, 2022

(65) Prior Publication Data
US 2024/0217258 A1 Jul. 4, 2024

(30) Foreign Application Priority Data
May 27, 2021 (EP) .................................... 21315092

(51) Int. Cl.
*B42D 25/387* (2014.01)
*B42D 25/405* (2014.01)
*B42D 25/45* (2014.01)

(52) U.S. Cl.
CPC ......... *B42D 25/387* (2014.10); *B42D 25/405* (2014.10); *B42D 25/45* (2014.10)

(58) Field of Classification Search
CPC ............................ B42D 25/405; B42D 25/387
See application file for complete search history.

(56) References Cited

U.S. PATENT DOCUMENTS

2003/0143426 A1* 7/2003 Haneda ................... B32B 7/023 428/690
2012/0091704 A1* 4/2012 Pohjola .................. B42D 25/29 283/92
(Continued)

FOREIGN PATENT DOCUMENTS

EP 3674099 A1 7/2020
EP 3674099 B1 * 9/2022 ............... B32B 7/02
(Continued)

OTHER PUBLICATIONS

"European Application Serial No. 21315092.3, Extended European Search Report mailed Nov. 22, 2021", 6 pgs.
(Continued)

*Primary Examiner* — Kyle R Grabowski
(74) *Attorney, Agent, or Firm* — Schwegman Lundberg & Woessner, P.A.

(57) ABSTRACT

A personalizable security document (10) includes a security feature (3*b*) including a combination of a plurality of different features. In particular, the security feature (3*b*) may include a laser-engraved image in a first layer (16), and one or more fluorescent inks (7*a*, 7*b*) in further layers (27*a*, 27*b*), which are disposed below the first layer. Optionally, a watermark (8) may also be provided in a lower layer (18). A laser-engraving of the image is performed from a first side (S1) of the substrate (1) such that patterns formed by the inks (7*a*, 7*b*) are not affected. Under white light, the laser-engraved image can be viewed from the first side of the substrate, whereas multi-color fluorescence of the patterns can be observed from the second side (S2) under UV light.

19 Claims, 2 Drawing Sheets

(56) References Cited

U.S. PATENT DOCUMENTS

| | | | | |
|---|---|---|---|---|
| 2014/0319817 | A1 | 10/2014 | Nikkila | |
| 2015/0129780 | A1 * | 5/2015 | Le Loarer | B42D 25/29<br>250/226 |

FOREIGN PATENT DOCUMENTS

| | | | | | |
|---|---|---|---|---|---|
| EP | 4063142 | A1 | * | 9/2022 | B42D 25/387 |
| WO | WO-2011043697 | A1 | * | 4/2011 | B42D 25/29 |
| WO | WO-2013143009 | A1 | * | 10/2013 | B42D 25/29 |
| WO | WO-2013191762 | A1 | | 12/2013 | |
| WO | WO-2018197277 | A1 | * | 11/2018 | B42D 25/23 |
| WO | WO-2021130035 | A1 | * | 7/2021 | B42D 13/00 |
| WO | WO-2022248309 | A1 | | 12/2022 | |

OTHER PUBLICATIONS

"European Application Serial No. 21315092.3, Response Filed May 24, 2023 to Extended European Search Report mailed Nov. 22, 2021", 11 pgs.
"International Application Serial No. PCT/EP2022/063452, International Search Report mailed Sep. 28, 2022", 4 pgs.
"International Application Serial No. PCT/EP2022/063452, Written Opinion mailed Sep. 28, 2022", 5 pgs.

* cited by examiner

PERSONALIZABLE SECURITY DOCUMENT AND METHOD OF MANUFACTURING THE SAME

CROSS-REFERENCE TO RELATED APPLICATION(S)

This application is a national stage application under 35 U.S.C. § 371 of PCT Appl. No. PCT/EP2022/063452, titled "Personalizable Security Document and Method of Manufacturing the Same," filed May 18, 2022, which claims priority to EP patent application Ser. No. 21/315,092.3, titled "Personalizable Security Document and Method of Manufacturing the Same," filed May 27, 2021, each of which is hereby incorporated by reference herein in its entirety.

TECHNICAL FIELD

The present disclosure generally relates to security features for security documents, in particular, personalizable security documents such as identification documents, driver's licenses and the like.

BACKGROUND

Generally, in the market of physical identification documents, a variety of different security features is used. In some applications, a laser engraved image is considered vital, as the image features are obtained inside a polycarbonate substrate rather than on the surface of the substrate. A laser engraved feature in a polycarbonate substrate may include a black and white (in particular, grayscale) image, a color image, or special features like the Mirage technology of the present applicant.

There are also other approaches for providing security features for such identification documents or other security documents, for example, using fluorescent inks to provide features which are only visible under UV light. US 2014/0319817 A1 discloses a security document comprising a first pattern and a second pattern overlapping to define a security pattern. The two patterns differ in their fluorescent properties, such that upon irradiation with a first wavelength, the light emitted by the first pattern is dominant, and upon irradiation with a second wavelength, the light emitted by the second pattern is dominant. EP 3 674 099 A1 discloses laminates, identification documents, and methods for verifying identification documents. WO 2013/191762 A1 discloses a static dissipating laser engravable film.

The present disclosure is directed, at least in part, to improving or overcoming one or more aspects of prior systems, without being limited to a particular type of security document.

SUMMARY OF THE DISCLOSURE

According to one aspect of the present disclosure, a personalizable security document comprises a substrate having a first side and a second side opposite to the first side in a thickness direction of the substrate, and a security feature formed in the substrate and extending through at least part of the substrate along the thickness direction. The security feature includes a first layer including a laser-engravable portion configured to have an image laser engraved in the same, the laser engraved image being visible when the substrate is viewed from the first side under white light, and a second layer arranged below the first layer, the second layer including a first pattern overlapping at least in part the laser-engravable portion when viewed along the thickness direction, the first pattern being visible at least in part when the substrate is viewed from the second side under UV light. The security feature further includes a third layer arranged below the second layer, the third layer including a second pattern overlapping at least in part the laser-engravable portion when viewed along the thickness direction, wherein each of the first pattern and the second pattern is visible at least in part when the substrate is viewed from the second side under UV light, the first pattern and the second pattern emitting light of a first color and a second color, respectively, upon irradiation with the UV light.

In another aspect of the present disclosure, a method of manufacturing a personalizable security document comprises the steps of providing a first substrate layer including a laser-engravable portion, providing a second substrate layer including a first pattern being visible under UV light, and arranging the second substrate layer below the first substrate layer such that the first pattern overlaps at least in part the laser-engravable portion. The method further comprises the step of combining the first layer with the second layer to form a substrate of the personalizable security document, wherein the laser-engravable portion is laser-engravable from a first side of the substrate, and the first pattern is visible at least in part when the substrate is viewed from a second side opposite to the first side in a thickness direction of the substrate under UV light. The method further comprises providing a third substrate layer including a second pattern being visible under UV light, arranging the third substrate layer below the second substrate layer such that the second pattern overlaps at least in part the laser-engravable portion, and combining the third layer with the first layer and the second layer to form the substrate, wherein each of the first pattern and the second pattern is visible at least in part when the substrate is viewed from the second side under UV light, the first pattern and the second pattern emitting light of a first color and a second color, respectively, upon irradiation with the UV light.

In yet another aspect, the present disclosure relates to a method of personalizing a security document, comprising the steps of providing a personalizable security document in accordance with the first aspect, and laser engraving a personalized image in the laser-engravable portion from the first side of the substrate.

In a further aspect, the present disclosure relates to a personalized security document obtained by the method of the previous aspect.

Other features and aspects of the present disclosure will be apparent from the following description and the accompanying drawings.

DETAILED DESCRIPTION

Figure 1:
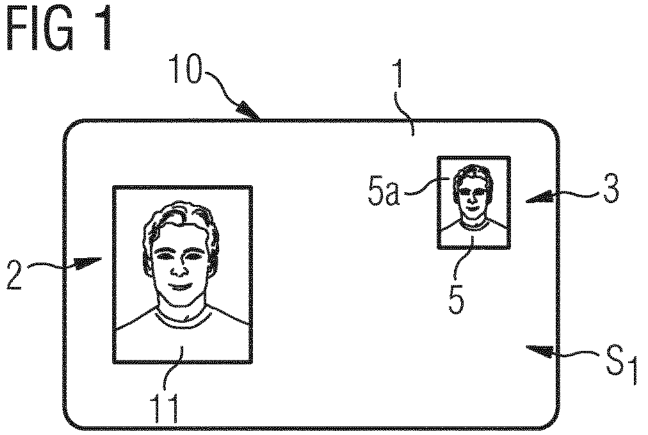
FIG. 1 shows a plan view an exemplary personalized security document in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that it may be advantageous to provide a security feature which combines different features in a single laserable window provided in a security document, for example, a polycarbonate card which is used as an identification document. It has been realized that a specialized ink can be used, which can be laser engraved, while one or more additional inks can be included, which may not react to the laser engraving. In this manner, level 1 (detectable without additional equipment) and level 2 (requiring additional equipment to be detected) security features can be engraved in the same window, while the specific features of the additional inks are not destroyed by the laser engraving.

In addition, it has been realized that the combination of the laser-engravable ink with one or more non-laser-engravable inks provides additional security, as specific laser parameters must be used for engraving the image in the laser-engravable ink while assuring that the additional inks are not affected by the laser engraving. In other words, if a forger were to attempt to forge the security document, he might not possess the knowledge required for successfully engraving the laser engraved image without destroying either one or more of the additional features, or the entire security window of the document, for example, when the laser power is set too high.

In addition, as the additional inks, which are not engraved by the laser, are provided in respective layers of a substrate of the document, a document becomes difficult to forge. In this respect, it has also been realized that it is advantageous to provide two or more, for example, fluorescent inks in such a manner in the security window that the respective inks overlap at least in part. In this manner, a multi-color fluorescence effect can be achieved, where three or more colors are visible under UV light.

With the above configuration, it becomes possible to use only a single laser for engraving a security image, while additional security features can be achieved due to use of the fluorescent inks, and providing a watermark or the like.

In addition, it has been realized that, by using a plurality of fluorescent inks, only a single UV light having a specific wavelength range can be used for observing the fluorescence features, and it is not necessary to use particular UV wavelengths to observe the security features.

FIG. 1 shows a plan view of an exemplary security document 10 in accordance with the present disclosure. As shown in the FIG. 1, security document 10 includes a substrate 1, for example, a polycarbonate or PVC substrate having a substantially rectangular shape. In particular, as shown in FIG. 1, security document 10 may be a personalized security document, i.e. include an image 11 (for example, a photograph or the like) of a person to which the document belongs. Image 11 may be formed in an image region 2 provided on a first side S1 of substrate 1 in a known manner.

In addition, as shown in FIG. 1, document 10 includes a security feature 3 formed in substrate 1, for example, in the shape of a rectangular window in which one or more security features can be provided. For example, as shown in FIG. 1, security feature 3 may include a laser engraved image 5, which may correspond to image 11 (for example, may be an inverse or negative of image 11), in a laser-engravable portion **5*a* of security feature 3**.

It will be appreciated that, after manufacturing, security document 10 may be a personalizable security document. In other words, image region 2 and laser-engravable portion **5*a* may be empty, such that security document 10** is not personalized. Generally, such personalization will be carried out by the respective issuers of the security documents, for example, passports, identification cards, driver's licenses or the like.

Figure 2:
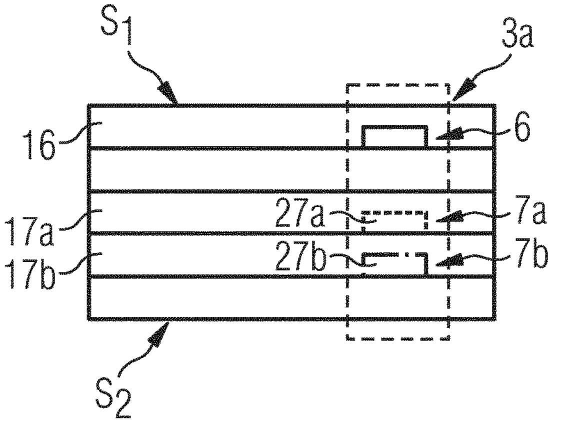
FIG. 2 shows a security feature provided in a security document in accordance with a first embodiment of the present disclosure.

FIG. 2 shows a schematic sectional view of a personalizable security document 10 in accordance with the present disclosure. As shown in FIG. 2, personalizable security document 10 comprises substrate 1 having first side S1 and a second side 2 opposite to first side S1 in a thickness direction d of substrate 1. For example, substrate 1 is formed by stacking a plurality of layers, for example, polycarbonate or PVC layers and combining them in an appropriate manner, for example, by lamination processes or the like. This is known to the skilled person, such that a detailed description will be omitted herein.

A security feature **3*a* is formed in substrate 1 and extends through at least part of substrate 1 along thickness direction d. In the example shown in FIG. 2, security feature 3*a* extends from the uppermost layer to the second layer from the bottom of substrate 1. In some embodiments, at least the portion of each layer in which security feature 3*a*** is formed is substantially transparent or at least semi-transparent for visible light.

In the embodiment shown in FIG. 2, security feature **3*a* includes a first layer 16 including laser-engravable portion 5*a*, which is configured to have image 5 laser engraved in the same. For example, laser-engravable portion 5*a* is formed by a laser-engravable ink 6 provided in first layer 16. In one example, ink 6 may be formed on a bottom surface of first layer 16, for example, by screen printing or the like. However, it will be appreciated that, in other embodiments, ink 6 may be formed on a top surface of first layer 16. First layer 16 may be covered by one or more protective layers (not shown). In other applications, first layer 16 may be the top layer of the stack of layers of substrate 1. In any case, first layer 16 is configured such that image 5 can be laser engraved in laser-engravable ink 6** by using an appropriately configured laser. This will be described in more detail below.

Security feature **3*a* further includes a second layer 17*a* arranged below first layer 16, for example, with one or more intermediate layers provided between layers 16 and 17*a*. It will be appreciated, however, that the intermediate layer(s) can also be omitted in other embodiments. Second layer 17*a* includes a first pattern 27*a* overlapping at least in part laser-engravable portion 5*a* when viewed along the thickness direction, as shown in FIG. 2. In other words, when viewed from the first side S1 or the second side S2 in a direction perpendicular to the substrate surface, laser-engravable ink 6 at least partially covers first pattern 27***a*, which may be formed by an ink 7*a* exhibiting a fluorescence effect. Preferably, ink 7*a* may be non-laserable, such that the properties of first pattern 27*a* are not affected when laser engraving of laser-engravable ink 6 is performed.

First pattern 27*a* may have any arbitrary shape, for example, comprising letters, symbols, polygonal or round or elliptic shapes, and the like. In the exemplary embodiment, ink 7*a* is fluorescent ink, such that, upon irradiation of an excitation light having a predetermined wavelength, ink 7*a* emits light having a different wavelength. For example, ink 7*a* may be configured to be irradiated with UV light having a specific wavelength, and may emit light in the visible range.

Specifically, first pattern 27*a* is provided such that it is visible at least in part when substrate 1 is viewed from the second side S2 under UV light. In other words, when UV light having a wavelength which can excite ink 7*a* is irradiated onto first pattern 27*a*, first pattern 27*a* emits visible light, which can exit from second side S2 of substrate 1 and can be observed by an observer. In this manner, at least part of first pattern 27*a* can be recognized under UV light.

As shown in FIG. 2, as an additional feature, security feature 3*a* also includes a third layer 17*b* arranged below second layer 17*a*. Again, one or more intermediate layers may be present in other embodiments. Third layer 17*b* includes a second pattern 27*b* overlapping at least in part laser-engravable portion 5*a* when viewed along the thickness direction. In addition, second pattern 27*b* is arranged such that each of first pattern 27*a* and second pattern 27*b* is visible at least in part when substrate 1 is viewed from second side S2 under UV light. This is due to the fact that first pattern 27*a* and second pattern 27*b* emit light of a first color and a second color, respectively, which are different from each other, upon irradiation with UV light. This may be achieved in different manners. For example, second pattern 27*b* may be formed by a fluorescent ink 7*b*, preferably also a non-laserable ink, which exhibits a fluorescence effect that is different from the fluorescence effect of ink 7*a*. In one example, inks 7*a* and 7*b* may be excitable by UV light having the same wavelength, but may emit visible light having different wavelengths. In other examples, first pattern 27*a* and second pattern 27*b* may be configured to emit light in response to being irradiated with excitation light having different wavelengths. This can be achieved by using UV light including a specific wavelength range capable of generating the fluorescence of both inks 7*a* and 7*b*. For example, such a range may be from 254 to 354 nm, or from 100 to 400 nm. In other words, it will be appreciated that, in accordance with the present disclosure, preferably broadband UV light is used to observe security feature 3*a*. When such broadband UV light is used, both first pattern 27*a* and second pattern 27*b* emit light in the visible range, which can be observed from second side S2.

Figure 8:
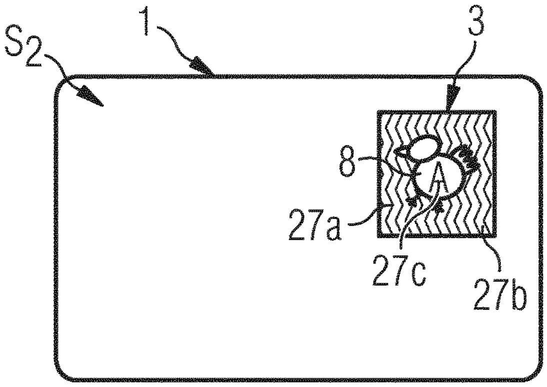

Here, it is preferable that first pattern 27*a* and second pattern 27*b* partially overlap when viewed along the thickness direction to define an overlap area 27*c*, which will be described later with respect to FIG. 8. Due to this overlap area, a three-color fluorescence effect can be observed from second side S2, because the color of the light emitted from overlap area 27*c* will appear different from the colors of light emitted by the non-overlapping parts of first pattern 27*a* and second pattern 27*b*. In some embodiments, first pattern 27*a* and second pattern 27*b* may be formed by screen printing, flexo printing, or offset printing. It will be readily appreciated that, in other embodiments, more than two patterns can be provided in respective layers, for example, a third pattern in a third layer, a fourth pattern in a fourth layer, and so on, each exhibiting fluorescence under UV light. In this case, it will be understood that one or more additional overlap areas can be provided, such that more-than-three-color fluorescence can be obtained, if desired.

Figure 3:
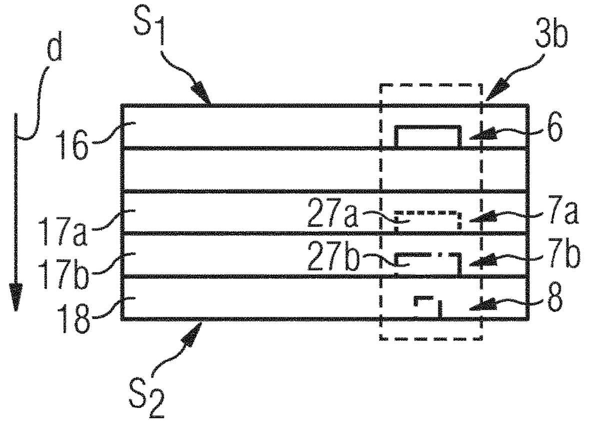
FIG. 3 shows a security feature provided in a security document in accordance with a second embodiment of the present disclosure.

In some embodiments, security feature 3*a* may further include a fourth layer 18 arranged below third layer 17*b*, as shown in FIG. 3. For example, fourth layer 18 may include a watermark 8 or the like formed in the same and overlapping at least in part laser-engravable portion 5*a* when viewed along the thickness direction. Watermark 8 is visible when substrate 1 is viewed from second side S2 under white light and/or when substrate 1 is viewed from first side S1 against white light, as will be described in more detail below. For example, watermark 8 may be printed onto fourth layer 18 by screen printing or offset printing or the like. The use and forming of such watermarks is well known to the skilled person, such that a detailed description will be omitted herein. The remaining configuration of the embodiment shown in FIG. 3 is the same as the configuration of the embodiment shown in FIG. 2.

As previously mentioned, laser-engravable portion 5*a* is formed by a laser-engravable ink 6, the transparency of which can be changed by irradiation of laser light of a particular wavelength and having different laser intensity. In some examples, a grayscale image may be engraved by varying the laser power between a minimum value and a maximum value corresponding to grayscale values between 0 and 255. In this manner, for example, a negative (inverted) image of image 11 shown in FIG. 1 can be engraved in laser-engravable ink 6 by an appropriate laser engraving apparatus. It will be appreciated that ink 6 is not particularly limited, as long as it is suitable for laser engraving. For example, ink 6 may be the ink which is used in the Mirage technology of the present applicant. In the Mirage technology, each pixel in the engraved image has a different color value, depending on the grayscale value of a grayscale image to be engraved. For example, a color value of blue corresponds to white in the grayscale image to be engraved, and a color value of gold corresponds to black in the grayscale image to be engraved. In other words, a minimum laser power results in that ink 6 remains blue, whereas a maximum laser power results in that ink 6 turns golden.

Figure 4:
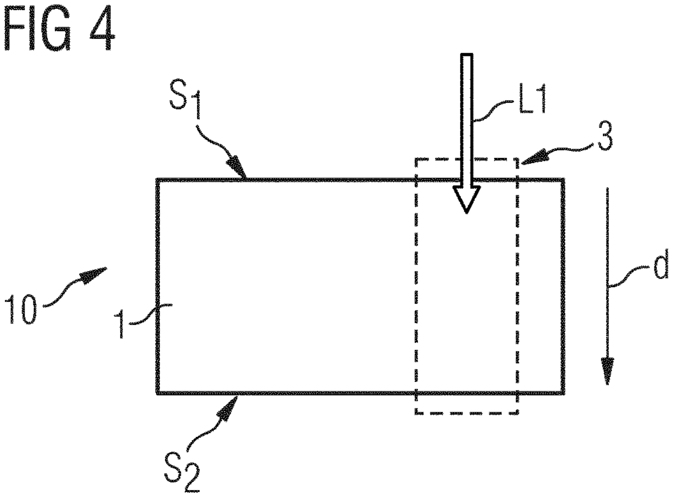
FIG. 4 is a schematic view illustrating a method of personalizing a security document in accordance with the present disclosure.

An exemplary method of engraving laser-engraved image 5 is schematically shown in FIG. 4. As shown in FIG. 4, laser light L1 is irradiated from first side S1 of substrate 1 in the thickness direction to change the properties of laserable ink 6 (for ease of illustration, the respective layers and inks are not shown in FIG. 4). Here, it is important to use a laser power which is not too high, but sufficient to change the properties of laserable ink 6. If the power of laser light L1 were too high, at least part of security feature 3 shown in FIG. 4 would be destroyed. Accordingly, individual features, which will be described in more detail in the following, could no longer be observed.

An appropriately configured (personalized) security document 10 in accordance with the present disclosure can exhibit the following effects. In other words, once laser-engraved image 5 has been successfully engraved in first layer 16, image 5*a* and patterns 27*a*, 27*b*, which are included in the respective layers 17*a*, 17*b*, as well as watermark 8 provided in fourth layer 18, if present, can be observed.

Figure 5:
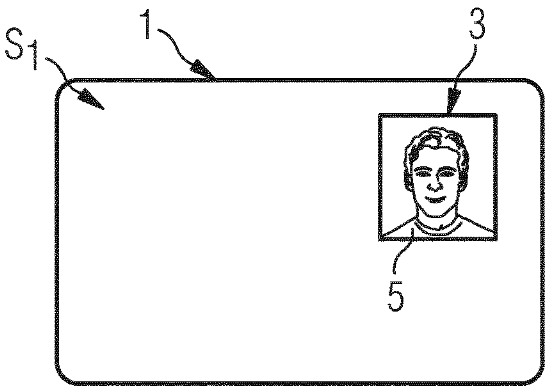
FIGS. 5 and 6 illustrate a front view and a rear view, respectively, of a security document when viewed under white light.
Figure 6:
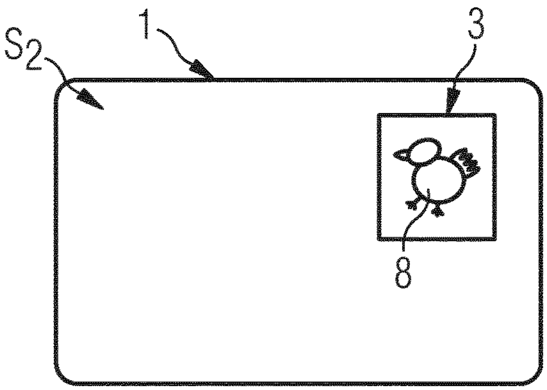
Figure 7:
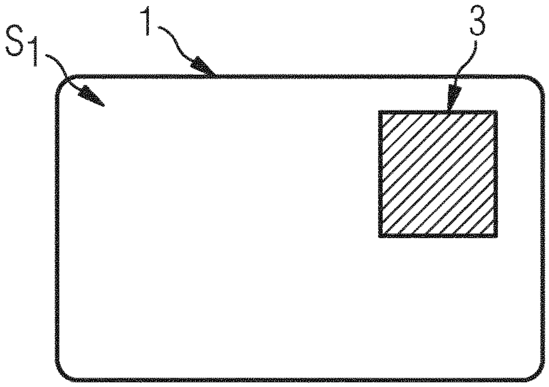
FIGS. 7 and 8 illustrate a front view and a rear view, respectively, of the security document when viewed under UV light.

For example, as shown in FIGS. 5 and 6, substrate 1 can be viewed from first side S1 and second side S2 under white (visible) light, i.e. light which is perceived by the human eyes as white, for example, sunlight. Accordingly, when viewed from first side S1, laser-engraved image 5 formed in first layer 16 can be recognized as part of security feature 3. However, first and second patterns 27*a*, 27*b* are generally not visible under white light. In addition, watermark 8 also cannot be observed from first side S1 under white light.

Upon observation under white light from second side S2, however, watermark 8 can be observed. On the other hand, image 5 generally cannot be seen from second side S2. This is due to the laser engraving of portion 5*a* generally only affecting the top portion of ink 6, but not the bottom portion of the same. Therefore, in embodiments where ink 6 is not transparent for visible light, the light is reflected by the rear surface of ink 6, which appears as a uniform background. It should be noted that, for ease of illustration, the window including security feature 3 is shown at the same position in both the front view and the rear view in FIGS. 5 and 6. Of course, it will be appreciated that the position of the security feature is in fact mirrored when substrate 1 is turned. The same applies to FIGS. 7 to 10, and to any feature that is visible from both sides, as will be described below.

The situation is different when substrate 1 is viewed under UV light. In this case, when viewed from first side S1, image 5 can no longer be recognized, as ink 6 is generally not excited by UV light. On the other hand, when viewed from second side S2, multi-color fluorescence due to patterns 27*a* and 27*b* can be observed. In the example shown, first pattern 27*a* is a set of lines, and second pattern 27*b* may, for example, be formed between said lines. In addition, watermark 8 may still be visible under UV light, for example, may appear black. In addition, as shown in FIG. 8, overlap area 27*c*, in which first pattern 27*a* and second pattern 27*b* overlap, is also visible, but with a color which is different from the first color of light emitted by first pattern 27*a* and the second color of light emitted by second pattern 27*b*. In the example, overlap area 27*c* is the letter "A" in the center. Therefore, a combination of a multi-color fluorescence and the watermark 8 is visible from second side S2 under UV light.

Figure 9:
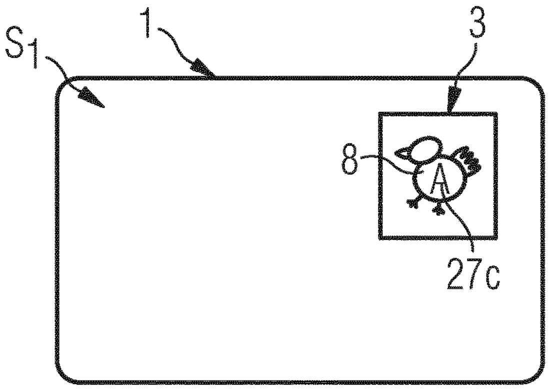
FIGS. 9 and 10 illustrate a front view and a rear view, respectively, of the security document when viewed against white light.
Figure 10:
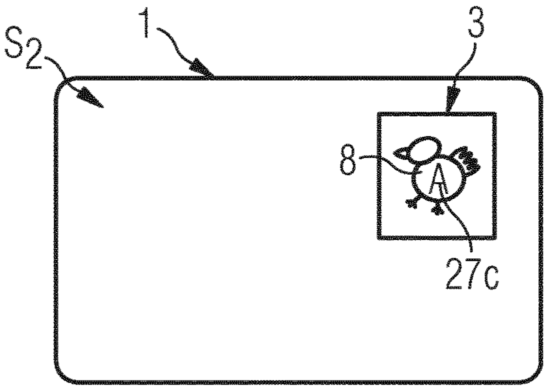

The situation is again different when substrate 1 is viewed against white light, i.e. in transmission. In this case, as shown in FIG. 9, watermark 8 can be observed from first side S1 in the usual manner. In addition, one or both of fluorescent patterns 27*a* and 27*b* may also be visible despite not being excited to be fluorescent. In the example shown in FIG. 9, overlap area 27*c* can be recognized. The same applies when substrate 1 is viewed against white light from second side S2. In this case, watermark 8 can again be recognized, as can overlap area 27*c*.

Although not shown in the figures, a further effect, which may be achieved in accordance with the present disclosure, is that first and/or second pattern 27*a* and 27*b* may result in a small color shift which can be observed in security feature 3 when substrate 1 is provided on different surfaces and viewed under white light. For example, the color of image 5 may vary slightly due to the presence of inks 7*a* and 7*b* below laser-engravable portion 5*a*, at least when patterns 27*a* and 27*b* overlap laser-engravable portion 5*a* to a large extent.

INDUSTRIAL APPLICABILITY

With the above-described configurations, a security document such as an ID card, a driver's license or the like having a security feature which includes a combination of different features can be obtained. In particular, the combination of a specific laser engraving process with the presence of one or more additional features such as fluorescent inks and a watermark results in an increased security and makes it very difficult for a potential forger to create a valid security document or modify an existing security document.

An exemplary method of manufacturing a personalizable security document as described above comprises the following steps: in a first step, a first substrate layer including a laser-engravable portion is provided. Then, a second substrate layer including a first pattern being visible under UV light is provided, and the second substrate layer is arranged below the first substrate layer such that the first pattern overlaps at least in part the laser-engravable portion. Here, it will be appreciated that one or more intermediate layers can be provided between first substrate layer 16 and second substrate layer 17*a*. In a further step, first layer 16 is combined with second layer 17*a* to form substrate 1 of the personalizable security document. The resulting personalizable security document is configured such that laser-engravable portion 5*a* is laser-engravable from a first side of substrate 1, and first pattern 27*a* is visible at least in part when substrate 1 is viewed from second side S2. Here, it will be appreciated that one or more intermediate layers or cover layers can be provided between and/or on top of first substrate layer 16 and/or second substrate layer 17*a*, as long as laser-engravable portion 5*a* can be laser engraved from first side S1, and first pattern 27*a* is visible at least in part when substrate 1 is viewed from second side S2 under UV light.

The method further comprises the step of providing a third substrate layer including second pattern 27*b* being visible under UV light. The substrate layer 17*b* may be arranged below second substrate layer 17*a* such that second pattern 27*b* overlaps at least in part laser-engravable portion 5*a*. Third layer 17*b* may again be combined with first layer 16 and second layer 17*a* to form substrate 1, with one or more intermediate layers or cover layers to be provided, if desired. Again, first pattern 27*a* and second pattern 27*b* are visible at least in part when substrate 1 is viewed from second side S2 under UV light, with first pattern 27*a* and second pattern 27*b* emitting light of different colors upon irradiation with UV light.

Optionally, a fourth substrate layer can be provided, with a watermark being printed onto fourth layer 18, for example, by screen printing or offset printing or the like. Fourth substrate layer 18 is arranged below third substrate layer such that the watermark overlaps at least in part the laser-engravable portion 5*a*. The fourth layer is then combined with the first layer 16, the second layer 17*a* and the third layer 17*b* to form substrate 1. The watermark is visible when substrate 1 is viewed from second side S2 under white light and/or when substrate 1 is viewed from the first side S1 against white light. In addition, watermark 8 may also be visible from second side S2 under UV light. Here, it will be appreciated that the watermark may be printed onto fourth layer 18 before combining the same with first layer 16, second layer 17*a* and third layer 17*b*. In other embodiments, however, the watermark may also be printed onto fourth layer 18 after combining the same with the other layers.

A personalizable security document obtained with the above-described methods may be personalized by laser engraving a personalized image 5 in laser-engravable portion 5*a* from first side S1 of substrate 1, as described above with reference to FIG. 4. As a result, a personalized security document 10 can be obtained, which includes security feature 3 having the above-described features.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A personalizable security document comprising:

a substrate having a first side and a second side opposite to the first side in a thickness direction of the substrate; and a security feature formed in the substrate and extending through at least part of the substrate along the thickness direction, wherein the security feature includes:

a first layer including a laser-engravable portion configured to have an image laser engraved in the same, the laser engraved image being visible when the substrate is viewed from the first side under white light;

a second layer arranged below the first layer, the second layer including a first pattern overlapping at least in part the laser-engravable portion when viewed along the thickness direction; and a third layer arranged below the second layer, the third layer including a second pattern overlapping at least in part the laser-engravable portion when viewed along the thickness direction;

wherein each of the first pattern and the second pattern is visible at least in part when the substrate is viewed from the second side under UV light, the first pattern and the second pattern emitting light of a first color and a second color, respectively, upon irradiation with the UV light; and wherein the laser engraved image is not visible when the substrate is viewed from the second side.

2. The security document of claim 1, wherein the first pattern and the second pattern are configured to emit light in response to being irradiated with excitation light having different wavelengths, and the first pattern and the second pattern are both visible upon irradiation with UV light including the different wavelengths.

3. The security document of claim 1, wherein the first pattern and the second pattern partially overlap when viewed along the thickness direction to define an overlap area, the overlap area being visible when the substrate is viewed from the second side under UV light and emitting light having a third color upon irradiation with the UV light.

4. The security document of claim 1, wherein the first pattern and the second pattern are formed by respective inks provided in the respective second and third layers, each of the inks exhibiting at least one of a fluorescence effect or a color change effect.

5. The security document of claim 1, wherein the security feature further includes a fourth layer arranged below the third layer, the fourth layer including a watermark formed in the same and overlapping at least in part the laser-engravable portion when viewed along the thickness direction, the watermark being visible at least one of when the substrate is viewed from the second side under white light or when the substrate is viewed from the first side against white light.

6. The security document of claim 5, wherein the watermark is printed onto the fourth layer by screen printing or offset printing.

7. The security document of claim 5, wherein the watermark is not visible when the substrate is viewed from the first side under white light.

8. The security document of claim 1, wherein the laser-engravable portion is formed by a laser-engravable ink provided in the first layer.

9. The security document of claim 1, wherein the substrate includes a plurality of substrate layers, each substrate layer including a corresponding one of the first, second, or third layers of the security feature.

10. The security document of claim 1, wherein the security feature extends through the substrate from the first side to the second side.

11. A method of manufacturing a personalizable security document, the method comprising:

providing a first substrate layer including a laser-engravable portion;

providing a second substrate layer including a first pattern being visible under UV light;

arranging the second substrate layer below the first substrate layer such that the first pattern overlaps at least in part the laser-engravable portion;

providing a third substrate layer including a second pattern being visible under UV light;

arranging the third substrate layer below the second substrate layer such that the second pattern overlaps at least in part the laser-engravable portion;

combining the first substrate layer with the second substrate layer to form a substrate of the personalizable security document, wherein the laser-engravable portion is laser-engravable from a first side of the substrate; and combining the third substrate layer with the first substrate layer and the second substrate layer to form the substrate;

wherein each of the first pattern and the second pattern is visible at least in part when the substrate is viewed from a second side, opposite to the first side in a thickness direction of the substrate, under UV light, the first pattern and the second pattern emitting light of a first color and a second color, respectively, upon irradiation with the UV light;

wherein the first pattern and the second pattern are not visible when the substrate is viewed from the first side under white light; and wherein at least one of the first pattern or the second pattern are visible when the substrate is viewed from the first side against white light.

12. The method of claim 11, further comprising:

providing a fourth substrate layer;

printing a watermark onto the fourth substrate layer by screen printing or offset printing;

arranging the fourth substrate layer below the third substrate layer such that the watermark overlaps at least in part the laser-engravable portion; and combining the fourth substrate layer with the first substrate layer, the second substrate layer, and the third substrate layer to form the substrate, wherein the watermark is visible at least one of when the substrate is viewed from the second side under white light or when the substrate is viewed from the first side against white light.

13. The method of claim 12, wherein the watermark is not visible when the substrate is viewed from the first side under white light.

14. The security document of claim 1, wherein the first pattern and the second pattern are not visible when the substrate is viewed from the first side under white light.

15. The security document of claim 14, wherein at least one of the first pattern or the second pattern are visible when the substrate is viewed from the first side against white light.

16. The security document of claim 1, wherein at least one of the first pattern or the second pattern are visible when the substrate is viewed from the second side against white light.

17. A method of personalizing a security document, comprising:

providing a personalizable security document in accordance with claim 1; and laser engraving a personalized image in the laser-engravable portion from the first side of the substrate.

18. The method of claim 17, wherein the personalized image is not visible when the substrate is viewed from the second side.

19. A personalized security document obtained by the method of claim 17.

* * * * *